(12) United States Patent
Tsirline et al.

(10) Patent No.: US 7,586,410 B2
(45) Date of Patent: Sep. 8, 2009

(54) RFID UHF STRIPLINE COUPLER

(75) Inventors: Boris Y. Tsirline, Libertyville, IL (US); Karl Torchalski, Arlington Heights, IL (US); Martin Andreas Karl Schwan, Chicago, IL (US)

(73) Assignee: ZIH Corp., Hamilton (BM)

( * ) Notice: Subject to any disclaimer, the term of this patent is extended or adjusted under 35 U.S.C. 154(b) by 272 days.

(21) Appl. No.: 11/371,785

(22) Filed: Mar. 9, 2006

(65) Prior Publication Data

US 2007/0216591 A1    Sep. 20, 2007

(51) Int. Cl.
*G08B 13/14* (2006.01)

(52) U.S. Cl. .............. 340/572.1; 340/572.4; 340/572.7; 340/572.8; 340/539.1; 340/825.69; 340/825.72; 235/375; 235/432

(58) Field of Classification Search .............. 340/572.1, 340/572.4, 572.7, 572.8, 539.1, 825.69, 675, 340/676, 10.1, 10.2; 235/383, 385, 487, 235/492

See application file for complete search history.

(56) References Cited

U.S. PATENT DOCUMENTS

| | | | | |
|---|---|---|---|---|
| 2,812,501 | A | * | 11/1957 | Sommers ..................... 333/238 |
| 5,192,954 | A | | 3/1993 | Brockelsby et al. |
| 7,342,499 | B2 | * | 3/2008 | Chiu et al. ............... 340/572.7 |

2005/0045723 A1    3/2005    Tsirline et al.

FOREIGN PATENT DOCUMENTS

FR    2 822 594    9/2002

OTHER PUBLICATIONS

Xianming Qing and Ning Yang; *2.45 GHZ Circularly Polarized RFID Reader Antenna*; IEEE; 2004; pp. 612-615 (XP10743394).
Written Opinion of the International Searching Authority for corresponding International Appl. No. PCT/US2007/063680.
International Search Report for corresponding International Appl. No. PCT/US2007/063680.
Ron Schmitt; *Understanding electromagnetic fields and antenna radiation takes (almost) no math*; EDN; Mar. 2, 2000; pp. 77-88; available at <http://www.ednmag.com>.

* cited by examiner

*Primary Examiner*—Hung T. Nguyen
(74) *Attorney, Agent, or Firm*—Alston & Bird LLP

(57) ABSTRACT

A stripline coupler for a RFID system is provided. The coupler is configured to communicate with a targeted transponder from among a group of multiple adjacent transponders. The coupler may include a conductive strip, a terminating load, a dielectric material, a first ground plane, and a second ground plane. The conductive strip extends between the first and second ground planes and the dielectric material from an input end connected to a transceiver to a loaded end connected to the terminating load. The conductive strip may be configured to propagate electromagnetic fields concentrated in a near field region of the conductive strip in a direction generally perpendicular to the conductive strip to couple with a targeted transponder. The coupler may include an enclosure for directing the electromagnetic fields. The conductive strip may have a tapered or non-linear profile such as a modified bow-tie profile, an exponential profile, or a Klopfenstein profile.

26 Claims, 4 Drawing Sheets

RFID UHF STRIPLINE COUPLER

BACKGROUND OF THE INVENTION

1. Field of the Invention

The present invention relates to RFID couplers and, in particularly, to spatially selective couplers capable of selectively communicating with a targeted transponder from among a group of adjacent transponders.

2. Description of Related Art

Radio frequency identification (RFID) transponders, either active or passive, are typically used with an RFID transceiver or similar device for communicating information back and forth. In order to communicate, the transceiver exposes the transponder to a radio frequency (RF) electromagnetic field or signal. In the case of a passive transponder, the RF electromagnetic field energizes the transponder and thereby prompts the transponder to respond to the transceiver by re-radiating the received signal back and modulating the field in a well-known technique called backscattering. In the case of an active transponder, the transponder may respond to the electromagnetic field by transmitting an independently powered reply signal to the transceiver.

Problems can occur when interrogating multiple adjacent transponders regardless on whether the transponders are passively or actively powered. For example, an interrogating electromagnetic signal may activate more than one transponder at a given time. This simultaneous activation of multiple transponders may lead to collision or communication, i.e. read and write, errors because each of the multiple transponders may transmit reply signals to the transceiver at the same time.

Several collision management techniques commercially exist for allowing near simultaneous communication between multiple transponders and a single transceiver while reducing communication errors. However, such collision management techniques tend to increase system complexity, cost, and delay response. Furthermore, such techniques are often "blind" in that they cannot locate a given transponder or more specifically recognize the position of a transponder within the interrogating RF electromagnetic field. For example, in a printer-encoder device, the device would not know whether the transceiver was communicating with a transponder proximate to the printhead or not.

Another method of preventing multiple transponder activation is to electrically isolate transponders from one another. For example, devices or systems may employ an RF-shielded housing or anechoic chamber for shielding the adjacent and non-targeted transponders from the electromagnetic field. In various applications, transponders individually pass though a shielded housing for individualized exposure to an interrogating RF electromagnetic field. Unfortunately, RF-shielded housings add cost and complexity to a system and limit the type (i.e., size) of transponders that can be processed by the system. Furthermore, many systems are limited with regard to space or weight and, thus, cannot accommodate such shielded housings.

The challenge of avoiding multiple transponder activation may be especially acute in some applications. RFID printer-encoders are one example. RFID printer-encoders are devices capable of encoding and printing on a series or stream of labels with embedded transponders. The close proximity of the transponders to each other, during processing, makes targeting a particular transponder for encoding purposes problematic. Moreover, the space, cost, and weight restrictions associated with such devices, among other factors, make collision management techniques or shielding components for alleviating multiple transponder activation less than desirable.

In light of the foregoing it would be desirable to provide a RFID system or device capable of interrogating individual transponders positioned among multiple adjacent transponders without the need for collision management techniques or shielding components.

BRIEF SUMMARY OF THE INVENTION

The present invention may address some of the above needs by providing a stripline coupler for a RFID system configured to selectively communicate with a targeted transponder from among a group of multiple adjacent transponders. The coupler is adapted to have a controlled transmission range that can be limited to minimize the inadvertent activation of transponders outside a transponder encoding region. As such, the coupler operates with little to no anti-collision management techniques or shielding components. The coupler of the present invention is relatively compact with a length usually one-half wavelength or less minimizing the footprint of the coupler within the space-restricted RFID system. Also, the coupler may have an enclosure configured to encourage a particular direction or profile of the transmission signals of the coupler. For example, the coupler may be configured for side coupling, i.e. the coupler may be perpendicular to the targeted transponder, which may be beneficial in a variety of space-restricted systems.

According to one embodiment of the present invention, the RFID system may include a transponder conveyance and a coupler. The transponder conveyance is adapted to transport the targeted transponder through the transponder encoding region along a predetermined path. The coupler may be a near field coupler and be configured to couple with the targeted transponder in the transponder encoding region. And the coupler may be perpendicular to the targeted transponder during coupling. The system may further include a transceiver that is in electrical communication with the coupler. The transceiver is configured to generate communication signals.

The coupler may include a first ground plane and a second ground plane spaced apart from each other and connected by one or more connections and a conductive strip positioned between the ground planes. The conductive strip is configured to propagate a plurality of electromagnetic fields, while the ground planes and connections between them are configured to promote the propagation of the electromagnetic fields from a side of the conductive strip. More specifically, the electromagnetic fields from the side of the conductive strip may be in a direction generally perpendicular to the length of the conductive strip and generally parallel to the grounds planes for coupling with the targeted transponder in the transponder encoding region. For example, the near field coupler may include a number of connections that extend substantially around the conductive strip and define one active side of the coupler free of connections and is configured to promote the propagation of the electromagnetic fields from the active side for coupling with the targeted transponder.

The coupler may also have a dielectric material positioned between the first ground plane and the second ground plane. For example, the dielectric material may be FR4 or air. The coupler may also include an input port for connecting the coupler to the transceiver and a terminating load defining an input impedance. The input impedance may be substantially equal to a source impedance defined by the transceiver. The conductive strip may extend from a first end that is connected to the input port and a second end that is connected to the terminating load.

The coupler of the present invention may further be configured to operate within a band of frequencies. The conductive strip defines a width and a length. According to one embodiment of the present invention, the width of the conductive strip remains substantially constant and the length of the conductive strip is substantially equal to one half wavelength of the centered frequency within the band of frequencies. According to another embodiment, the width of the conductive strip varies forming a tapered profile and the length of the conductive strip is equal to or less than one half wavelength of the centered frequency. For example, the tapered profile of the conductive strip may be a modified bow-tie profile, an exponential profile or a Klopfenstein profile.

The dielectric material may form two separate dielectric substrates. The conductive strip may be directly deposited onto one of the surfaces of the dielectric substrates. Or the dielectric material may form one overall substrate layer having a cut-out for receiving the conductive strip.

According to one embodiment of the present invention, the input port is adjacent to one of the ground planes and is connected to the first end of the conductive strip by a connection extending through the ground plane, the dielectric material, and to the conductive strip. And the terminating load is adjacent to one of the ground planes and is connected to the second end of the conductive strip by a connection extending through the ground plane, the dielectric material, and to the conductive strip.

The conductive strip defines a characteristic impedance which may be less than the load impedance. For example, the load impedance may be substantially equal to 50 ohms and the characteristic impedance may be less than 50 ohms.

In another aspect, the present invention provides a RFID printer-encoder for printing on and encoding a series of media units. At least one of the media units includes one or more transponders. The printer-encoder may include a printhead, a media conveyance system, a transceiver, and a coupler. The printhead is configured to print indicia onto the media units. The media conveyance system is adapted to transport the media units to the printhead and a transponder encoding region along a feed path. The transceiver is configured to generate communication signals. The coupler defines a width and a length and is configured to receive the communication signals from the transceiver and communicate with the transponder or transponders in the transponder encoding region. The coupler is structured such that the width of the coupler is generally perpendicular to a direction of the feed path in the transponder encoding region. Also, the coupler may be structured such that the length of the coupler is generally perpendicular to the direction of the feed path as well.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

Figure 2A:
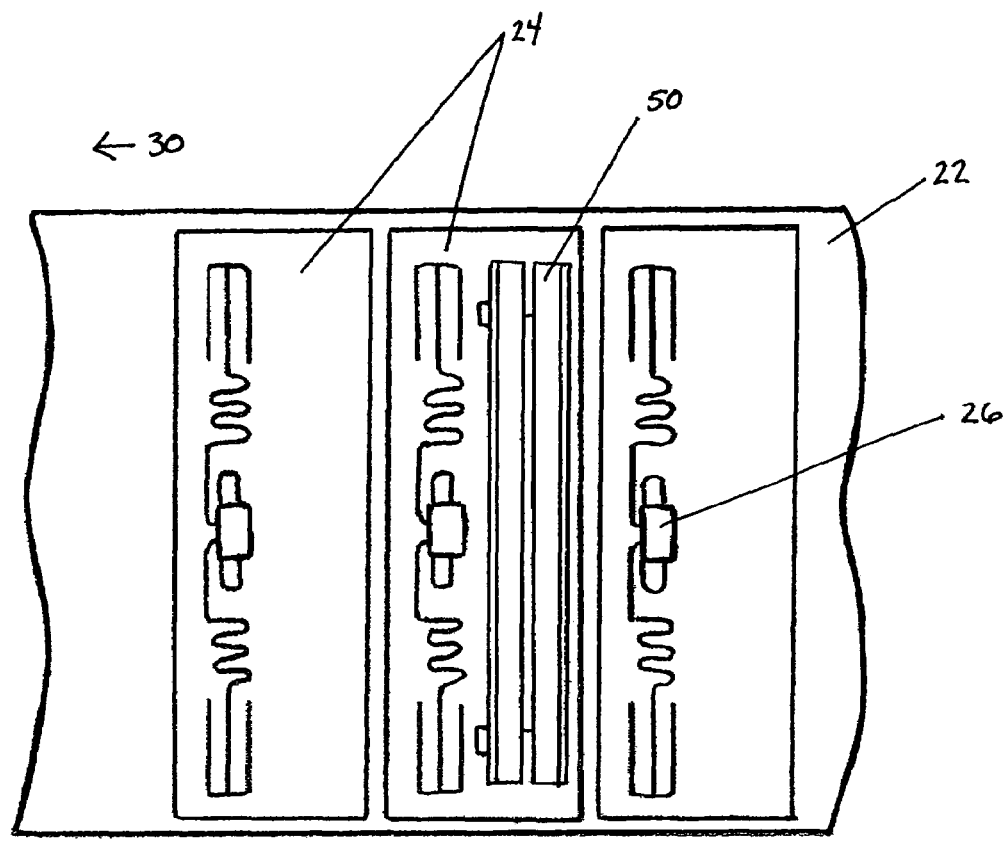
FIG. 2a is a simplified cut-away top view of a web of media units passing over a coupler according to an embodiment of the present invention.
Figure 2B:
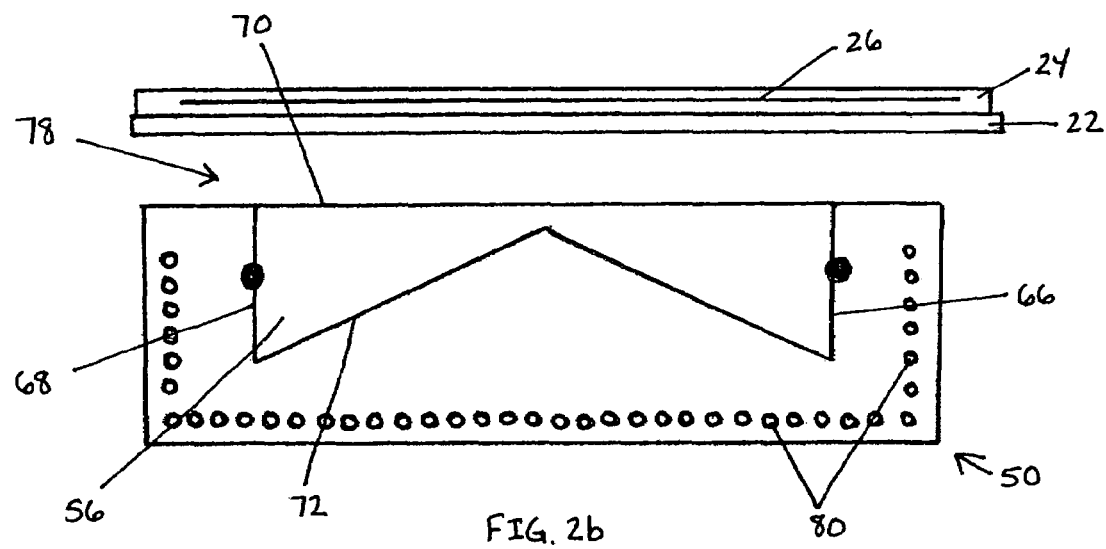
Figure 3:
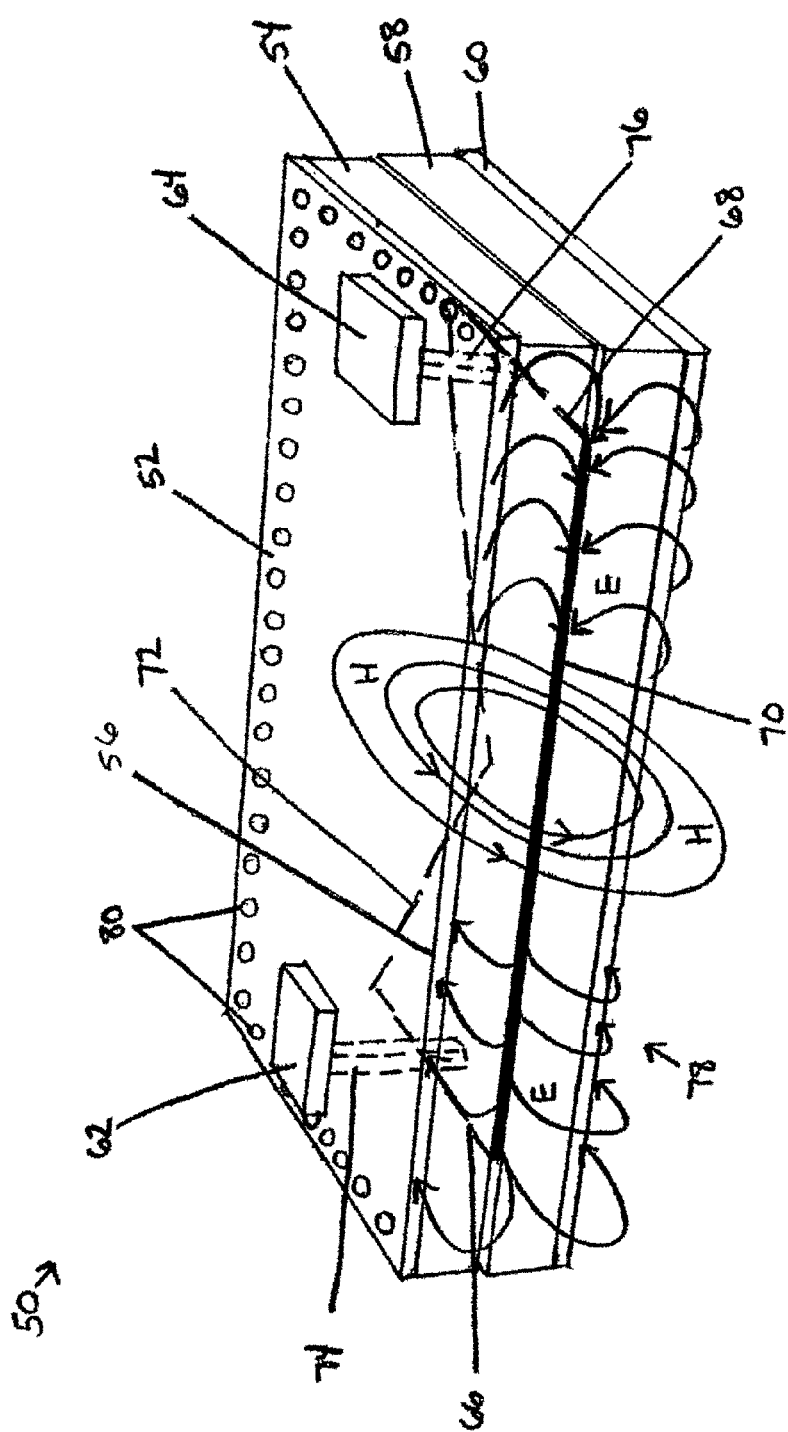
Figure 4:
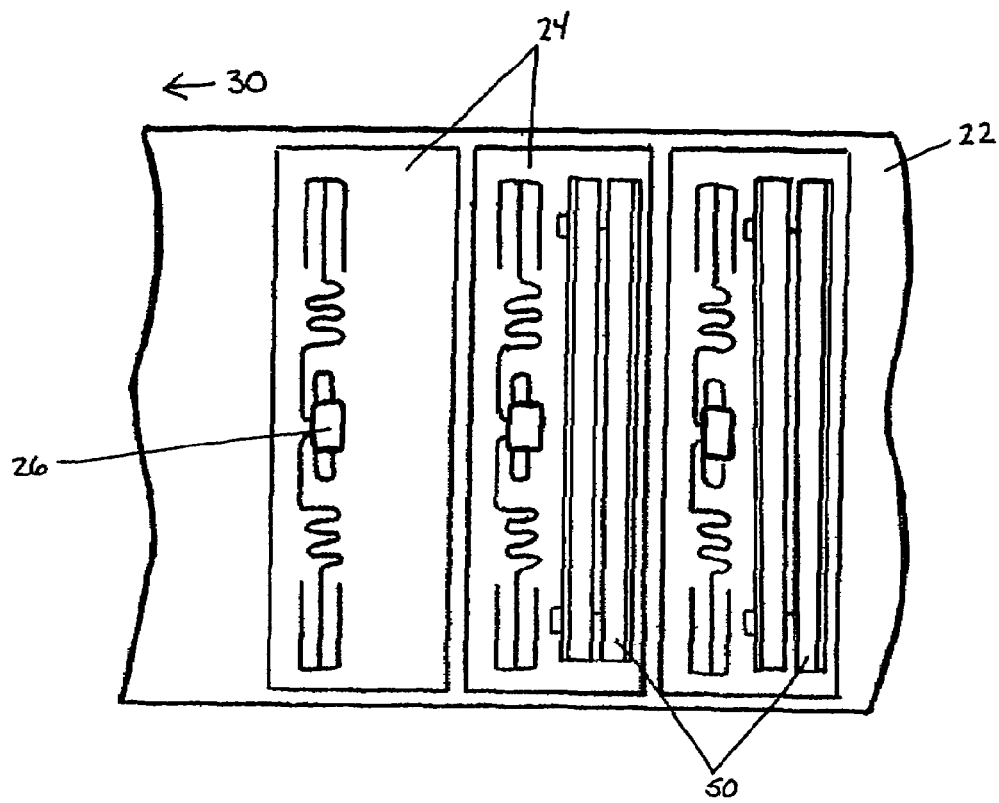
Figure 5:
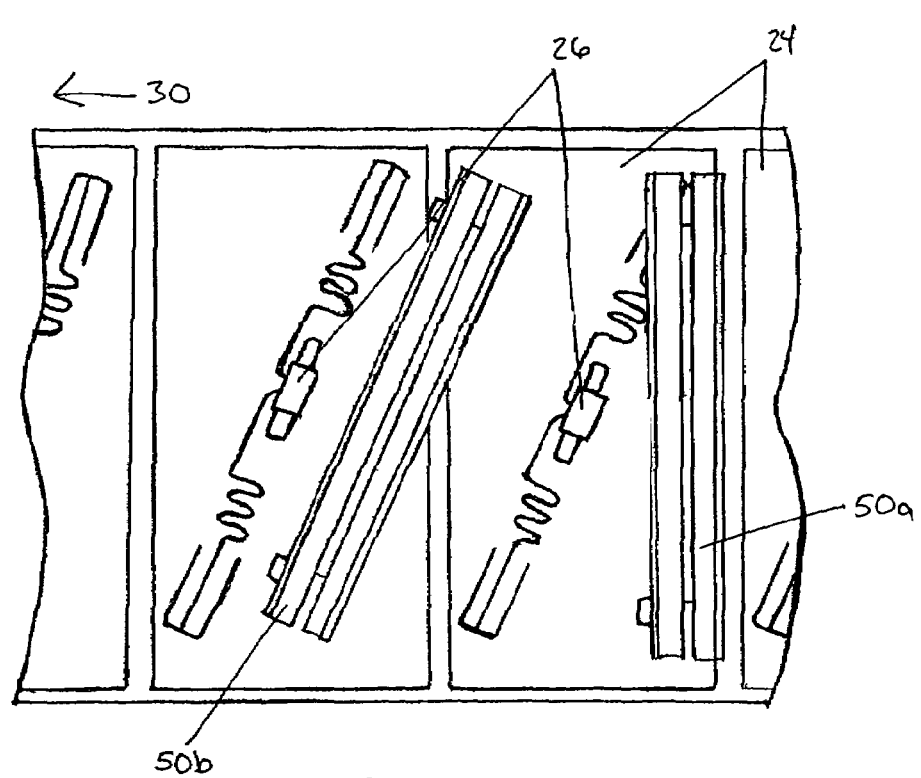

FIG. 2b a cross-section view of the web and coupler of FIG. 2a;

FIG. 3 is a perspective view of an electromagnetic field distribution of the coupler of FIG. 2b;

FIG. 4 is a simplified cut-away bottom view of a web of media units passing over a coupler array according to another embodiment of the present invention; and FIG. 5 is a simplified cut-away bottom view of a web of media units passing over a coupler array according to yet another embodiment of the present invention.

DETAILED DESCRIPTION OF THE INVENTION

The present invention now will be described more fully hereinafter with reference to the accompanying drawings, in which some, but not all embodiments of the invention is shown. Indeed, this invention may be embodied in many different forms and should not be construed as limited to the embodiments set forth herein; rather, these embodiments are provided so that this disclosure will satisfy applicable legal requirements. Like numbers refer to like elements throughout.

The present invention concerns an apparatus for enabling an RFID transceiver (sometimes referred to as a "reader") to selectively communicate with a targeted transponder that is commingled among or positioned in proximity to multiple adjacent transponders. As will be apparent to one of ordinary skill in the art, various embodiments of the present invention are described below that selectively communicate with a targeted transponder requiring little to no physical isolation of the transponder using space-consuming shielded housings, anechoic chambers, or relatively more complex or costly collision management techniques.

Several embodiments of the present invention may be useful for reading, writing, or otherwise encoding passive or active transponders located on assembly lines, in inventory management centers where on-demand RFID labeling may be needed, or in other similar circumstances, where the transponders are in close proximity to each other. In various embodiments, one or more transponders are mounted to or embedded within a label, ticket, card, or other media form that may be carried on a liner or carrier. In alternate linerless embodiments, a liner or carrier may not be needed. Such RFID enabled labels, tickets, tags, and other media forms are referred to collectively herein as "media units." As will be apparent to one of ordinary skill in the art, it may be desirable to print indicia such as text, numbers, barcodes, graphics, etc., to such media units before, after, or during communications with their corresponding transponders.

The present invention has been depicted, for illustration purposes, in the context of a specific application, namely, RFID enabled printer systems, also referred to herein as "printer-encoders." Examples of printer-encoders are disclosed in commonly-owned U.S. Pat. Nos. 6,481,907 and 6,848,616, which are hereby incorporated herein by reference. However, the inventive concepts described herein are not limited to printer-encoders and may be applied to other RFID enabled systems that may benefit from the ability to selectively communicate with a targeted transponder disposed among multiple adjacent transponders close to the coupler.

Figure 1:
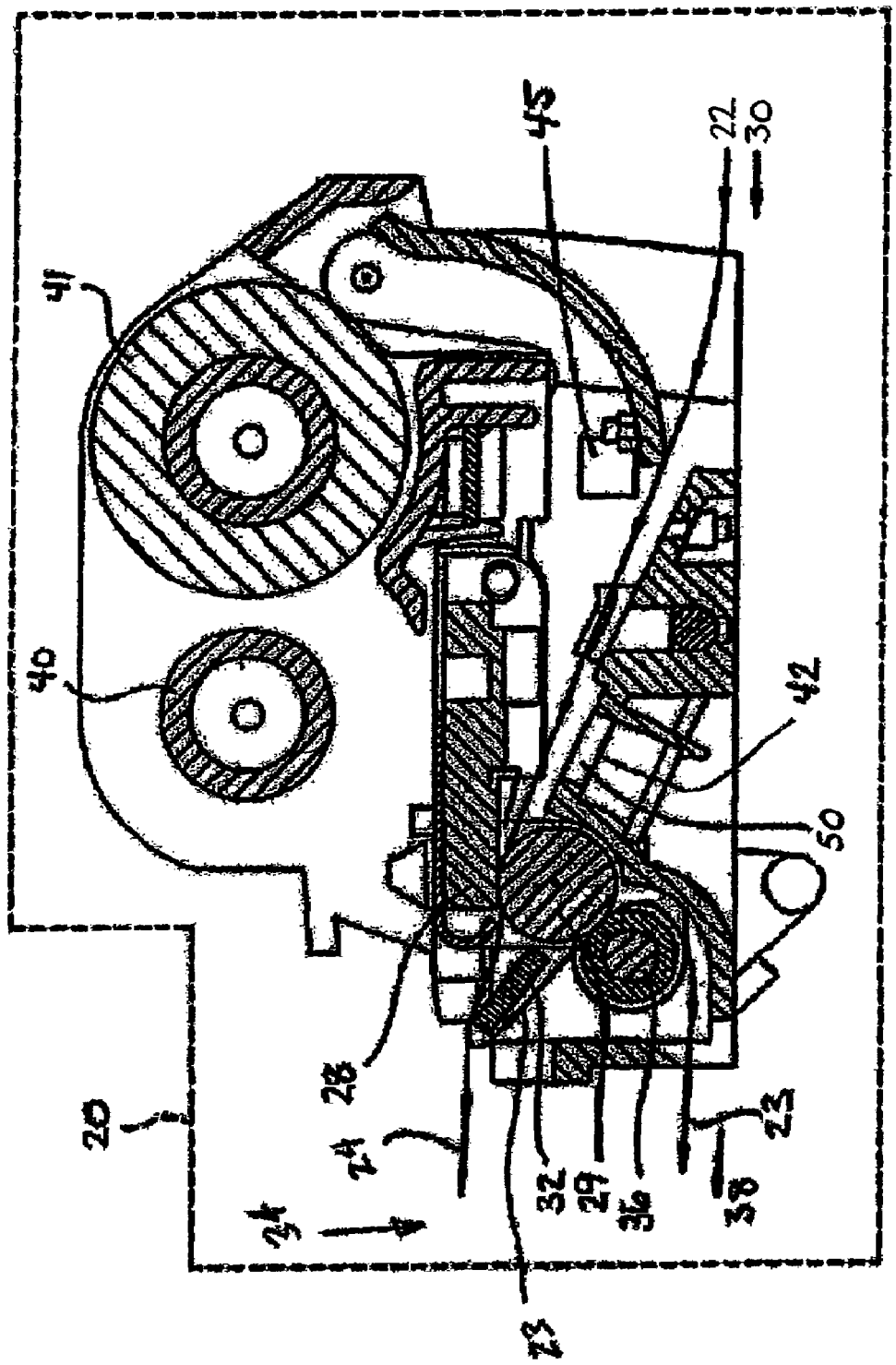
FIG. 1 is a side schematic view of a printer-encoder according to an embodiment of the present invention.

FIG. 1 illustrates an RFID printer-encoder 20 structured for printing and programming a series or stream of media units 24 according to one embodiment of the present invention. In various embodiments, as shown in FIGS. 2a and 4, at least a few of the media units 24 include transponders 26. As noted above, media units may include labels, cards, etc, that are carried by a substrate liner or web 22 as shown.

Referring back to FIG. 1, the printer-encoder 20 includes several components, such as a printhead 28, a platen roller 29, a feed path 30, a peeler bar 32, a media exit path 34, rollers 36, a carrier exit path 38, a take-up spool 40, a ribbon supply roll 41, a transceiver 42, a controller 45, and a coupler 50. The web 22 is directed along the feed path 30 and between the printhead 28 and the platen roller 29 for printing indicia onto the media units 24. The ribbon supply roll 41 provides a thermal ribbon (not shown for clarity) that extends along a path such that a portion of the ribbon is positioned between the printhead 28 and the media units 24. The printhead 28 heats up and presses a portion of the ribbon onto the media units 24 to print indicia. The take-up spool 40 is configured to receive and spool the used ribbon. This printing technique is commonly referred to as a thermal transfer printing. However, several other printing techniques may be used including, but not limited to, direct thermal printing, inkjet printing, dot matrix printing, and electro-photographic printing.

After printing, as shown in FIG. 1, the media unit web 22 proceeds to the media exit path 34 where the media units are typically individually removed from the web 22. For example, in one embodiment, pre-cut media units 24 may be simply peeled from the web 22 using the peeler bar 32 as shown. In other embodiments, a group of multiple media units may be peeled together and transmitted downstream to an in-line cutter for subsequent separation (not shown). Various other known media unit removal techniques may be used as will be apparent to one of ordinary skill in the art.

In applications, such as the depicted embodiment, in which the media units 24 are supported by a web 22, the web 22 may be guided out of the printer-encoder 20 along the carrier exit path 38 by rollers 36 or other devices. Techniques and structures for conveying or guiding the web of media units along the entire feed path of the printer-encoder are well known in the art and, thus, such techniques and conveyance systems are not described in great detail.

The transceiver 42 is configured for generating and transmitting RF communication signals that are broadcasted by the spatially selective coupler 50 located proximate the media feed path 30. For purposes of the present specification and appended claims, the transceiver 42 and the coupler 50 will be referred to collectively as forming at least part of a communication system. As will be explained in more detail below, the communication system transmits an electromagnetic signal or pattern for establishing, at predetermined transceiver power levels, a mutual coupling between the transceiver and a targeted transponder of a media unit that is located in the transponder encoding region, such that data may be read from and written to transponder. The electromagnetic signal has a far field component and a near field component. In general, the far field component is too weak to activate or communicate with any of the transponders, while the near field component is concentrated mostly in the transponder encoding region such that it only activates or communicates with the transponders in the transponder encoding region.

In general, the transceiver is a device configured to generate, process, and receive electrical communication signals. One in the art would appreciate that similar devices such as transmitters, receivers, or transmitter-receivers may be used within this invention. "Transceiver" as used in the present application and the appended claims refers to the devices noted above and to any device capable of generating, processing, or receiving electrical and/or electromagnetic signals.

FIG. 3 illustrates the stripline coupler 50 in accordance with an embodiment of the present invention. The coupler 50 is structured in electrical communication with the transceiver (not shown in FIG. 3) for receiving and broadcasting the signals originating from the transceiver to the targeted transponder. In the depicted embodiment, the stripline coupler 50 includes a first ground plane 52, a first dielectric substrate 54, a conductive strip 56, a second dielectric substrate 58, a second ground plane 60, an input port 62 and a terminating load 64.

The ground planes 52, 60, the dielectric substrates 54, 58, and the conductive strip 56 are stacked such that the conductive strip 56 is between the dielectric substrates 54, 58 and the ground planes 52, 60. More specifically according to the illustrated embodiment, the first ground plane 52 has a first surface and an opposite second surface. The first dielectric substrate 54 has a first surface and an opposite second surface. The first surface of the first dielectric substrate 54 is adjacent to the second surface of the first ground plane 52. The conductive strip 56 also has a first surface and an opposite second surface. The first surface of the conductive strip 56 is adjacent to the second surface of the first dielectric substrate 54. The second dielectric substrate 58 has a first surface and an opposite second surface. The first surface of the second dielectric substrate 58 faces the second surface of the first dielectric substrate 54 and is adjacent to the second surface of the conductive strip 56. The second ground plane 60 has a first surface and an opposite second surface. The first surface of the second ground plane 60 is adjacent to the second surface of the second dielectric substrate 58.

Although the first and second dielectric substrates 54, 58 are primarily described as separate layers within the coupler 50, the first and second dielectric substrates may be one overall substrate or dielectric layer that is between the two ground planes 52, 60 and includes a cut-out area configured to receive the conductive strip 56. Also, the ground planes and dielectric substrates are depicted as being generally rectangular in shape. However, the general shape of the ground planes and the dielectric substrates may vary between applications. For example, the ground planes and the dielectric substrates may be a portion of a relatively larger printed circuit board. The dielectric substrates may be made or constructed from various dielectric materials, including but not limited to, plastics, glasses, ceramics, or combinations such as Rogers materials, Isola materials, or woven glass reinforced epoxy laminate, commonly referred to as "FR4" or flame resistant 4. Moreover, the dielectric material may be air. Therefore the two ground planes may be spaced apart from each other and have only air and the conductive strip between them. One in the art would appreciate that these various materials may be used to achieve a specific dielectric constant.

As explained in more detail below, the conductive strip 56 provides a conductive plane for the propagation of electromagnetic waves from the coupler to a targeted transponder. The conductive strip is fabricated from a conductive material. For example only, the conductive material may be copper, gold, silver, aluminum or combination thereof, or doped silicon or germanium. The conductive strip 56 has a length extending from a first end, referred to herein as the input end 66, to a second end, referred to herein as the loaded end 68. The conductive strip 56 defines a width from a first side edge 70 to a second side edge 72. The conductive strip 56 also has a thickness extending from the first surface of the conductive strip to the second surface of the conductive strip.

The method of fabricating the coupler, including the conductive strip may vary. For example and as noted above, the dielectric substrate may include a cut out area in which the conductive strip is inserted into. The conductive strip may also be deposited directly onto either the second surface of the first dielectric substrate or the first surface of the second dielectric substrate. For example only, the conductive strip may be printed or etched onto one of these surfaces.

The input end 66 of the conductive strip is connected to the input port 62. For example only and as shown in FIGS. 2a and 3, the input port 62 may be adjacent to the first surface of the first ground plane 52 and may be connected to the input end 66 of the conductive strip by a vias or other connection 74 extending through the first ground plane 52 and the first dielectric substrate 54 to the conductive strip 56. The loaded end 68 of the conductive strip is connected to the terminating load 64. Again for example only and as shown in FIGS. 2a and 3, the terminating load 64 may be adjacent to the first surface of the first ground plane 52 and may be connected to the loaded end 68 of the conductive strip by a vias or other connection 76 extending through the first ground plane 52 and the first dielectric substrate 54 to the conductive strip 56.

The input port 62 connects the transceiver directly (or indirectly through any form of transmission line) to the coupler. For example, the input port may be a "RF port" as known in the art. In particular, the transceiver is configured to send an electrical source signal to the coupler through the input port. The signal passes through the input port 62, the conductive strip 56, and into the terminating load 64, which is connected to at least one of the ground planes 52, 60.

In general as the electrical signal passes through the conductive strip, the conductive strip operates as a transmission line, rather than operating as a standing wave radiating antenna or magnetic field generating coil. The passing signal in the conductive strip generates electromagnetic fields concentrated in the near field region of the conductive strip. The electromagnetic fields may be adapted to couple the coupler to a transponder disposed proximate the conductive strip, referred to herein as the transponder encoding region. A more detailed description of the electromagnetic fields concentrated in the near field region, also known as "leaky" electromagnetic fields, is provided in "Leaky Fields on Microstrip" L. O. McMillian et al. Progress in Electromagnetics Research, PIER 17, 323-337, 1997 and in commonly owned U.S. Patent Application Publication Nos. 2005/0045723 and 2005/0045724 to Tsirline et al., which are hereby incorporated by reference. The effective range of couplers relying on such leaky electromagnetic fields is limited because the fields degrade, at an exponential rate, with increasing distance from the coupler. This limited range reduces the likelihood that a given transceiver's signal will activate transponders outside the transponder encoding region.

The length of the conductive strip is one aspect of the present invention. The length of the conductive strip is based on a one-half wavelength, or multiple thereof, of the center operating frequency of the coupler. According to an embodiment of the present invention, the conductive strip has a linear length approximately equal to a one-half wavelength of the center operating frequency. As used herein "linear length" defines the length of a conductive strip from the input end to the loaded end when the width of the conductive strip remains substantially constant along the length. However as seen in the illustrated embodiment the conductive strip may have a width that varies along its length. As used herein "nonlinear length" defines a length of a conductive strip from the input end to the loaded end when the width of the conductive strip varies along the length such that width defines a tapered profile.

As stated above the conductive strip is terminated at one end by the terminating load. The terminating load is configured to have an impedance value substantially equal to a source impedance defined by the transceiver and its related circuitry. For example, the terminating load and the source impedance may be 50 ohms. In general, at the center operating frequency, the input impedance of the coupler measured at the input end of a conductive strip that has a linear length of one half wavelength, or multiple thereof, is substantially equal to the terminating load regardless of the characteristic impedance of the conductive strip. Moreover, a linear conductive strip may be effectively shortened by tapering the conductive strip, such that the width of the conductive strip varies over the length of the conductive strip. In other words, a tapered conductive strip having a nonlinear length less than one half wavelength is similar to a conductive strip having a linear length equal to one half wavelength in that it has minimal impact on the input impedance. The characteristic impedance of the conductive strip is defined by the width of the conductive strip. Because it has no or minimal influence on the input impedance of the coupler at the center operating frequency, the conductive strip is dimensioned to achieve proper coupling with a targeted transponder, while the terminating load is configured to maintain an impedance match between the coupler and the transceiver. For example, the width of the conductive strip may be decreased or increased at selective areas to produce a desired operating bandwidth of the coupler. Decreasing the width of the conductive strip at its center generally increases (i.e. widens) the bandwidth.

Although the relationship between the characteristic impedance of the conductive strip and the terminating load impedance may vary, according to one embodiment the characteristic impedance is less than the terminating load impedance. Terminating the conductive strip with a terminating load allows for impedance matching. Further, terminating the conductive strip with a terminating load that is substantially equal to the source impedance and greater than the characteristic impedance of the conductive strip forms what is known in the art as a "band-pass filter." A band-pass filter is a device that is configured to transmit signals in a particular frequency band or bandwidth. For example, the coupler may have an operating frequency band of 902 MHz-928 MHz and a center operating frequency of 915 MHz.

FIGS. 2b and 3 illustrate one example of a tapered conductive strip 56 according to an embodiment of the present invention. One side edge 72 of the conductive strip is angled inwardly from the input end 66 to a midpoint in the conductive strip 56 then the side edge 72 is angled outwardly from the midpoint to the loaded end 68. The opposite side edge 70 of the conductive strip remains substantially straight and parallel relative to the length of the conductive strip 56 from the input end 66 to the loaded end 68. The two side edges 70, 72 together define a "modified bow-tie" profile. However the profile of the conductive strip may vary. One in the art would appreciate the various possible tapered profiles including, but not limited to, exponential and Klopfenstein taper profiles.

One aspect of the present invention is the orientation of the coupler and, more particularly, of the conductive strip to the targeted transponder during coupling. As illustrated in FIG. 3, the dielectric substrates 54, 58 adjacent to the first and second surfaces of the conductive strip 56 along with the ground planes 52, 60 promote the propagation of the electromagnetic fields E, H from the side edges 70, 72 of the conductive strip in a direction generally perpendicular to the length of the conductive strip 56 and generally parallel to the ground planes 52, 60 (referred to herein as side propagation) and thus facilitates the coupling with a transponder that is positioned generally perpendicular to the conductive strip 56 and thus the coupler (referred to herein as side coupling). As used herein, the transponder and coupler are considered to be perpendicular when the width of the conductive strip is perpendicular to a length of the transponder.

To further promote side propagation, the two ground planes 52, 60 may be connected along their perimeters, such that the two ground planes 52, 60 are connected along three sides. The fourth and unconnected side is referred to as the active side 78. The ground planes 52, 60 in effect form an envelope or an enclosure for receiving the conductive strip 56, where one side, i.e., the active side 78, of the envelope is opened such that the electromagnetic fields propagate out of the envelope and are directed or aimed at the targeted transponder. For example and as shown in FIGS. 2b and 3, the two ground planes 52, 60 may be connected by a series of vias 80 extending along the three sides. Also, as shown, in the modified bow-tie profile embodiment, the substantially straight side edge 70 of the conductive strip 56 is positioned such that it is facing out and near the active side 78 defined by the ground planes 52, 60. The connected sides of the ground planes 52, 60 will further promote side propagation from the straight side edge 70 of the conductive strip through the active side 78 defined by the ground planes 52, 60. While the described embodiment uses a plurality of vias 80 to connect the first and the second ground planes 52, 60, a plurality of vias is only an example of the type of connections that may be employed with the present invention. Another example includes using additional ground planes or combination of additional ground planes and vias to connect the first and second ground planes along their edges to create the envelope for receiving the conductive strip.

In yet another means of promoting side propagation may be the shape of the conductive strip. For example, the modified bow-tie profile of the illustrated embodiment, concentrates a maximum magnetic field strength H at the straight side edge 70 near the middle point where the width of the conductive strip 56 is the narrowest, as well as fringe electric fields E along the side edge 70.

As illustrated in FIGS. 2a and 2b, the enclosed design of the coupler 50 also provides a novel architecture for the printer-encoder installation. Also described above, within a printer encoder, a web 22 of media units 24 may be directed along a feed path 30 by a media conveyance system. The feed path includes passing near or through the transponder encoding region where the coupler is configured to couple with the transponders of the media units. The direction of the feed path near or through the transponder encoding region defines a feed direction. Because the coupler of the present invention is configured for side coupling, the coupler 50 may be generally perpendicular to the web 22 of media units 24. As used herein, a coupler is generally perpendicular to the web of media units when the width of the conductive strip, which also generally defines a width of the coupler, is generally perpendicular to the feed direction.

This configuration of the coupler in a generally perpendicular orientation relative to the feed path may provide a desired printer-encoder architecture, structure, or configuration. Specifically, because the width of the coupler is relatively vertical, the coupler occupies less horizontal space in the printer-encoder providing more horizontal space or allowing for a more horizontally compact package, which in turn allows for smaller media unit sizes.

Although the present invention has been primarily described as a coupler for an RFID enabled system, the present invention may employ more than one coupler. For example and as shown in FIG. 4, the present invention may include more than one coupler 50. The couplers 50 together define a coupler array. Individual couplers within the array may be selectively activated in order to follow a targeted transponder as it moves along a predetermined path within the system or accommodate different size or type of tags.

The orientation of the couplers 50 to the feed path 30 or to each other may vary. As shown in FIG. 4, the couplers 50 may be substantially parallel to each other and generally perpendicular to the feed path 30. FIG. 5 illustrates another embodiment of a coupler array having at least one coupler 50a that is perpendicular to the feed path and at least one other coupler 50b that is at a 45° angle to the feed path 30. Positioning the couplers at different angles or orientations to the feed path enables the array to communicate with a greater variety of media units. More specifically, in many applications the transponders 26 are generally parallel to the width of the media units 24, such that the transponders 26 are generally perpendicular to the feed path 30, as shown in FIG. 4. However, in other applications the transponders 26 may be angled across the media unit 24. For example, and as shown in FIG. 5, the transponders 26 may be positioned diagonally across the media unit 24, such that the transponders 26 are generally at a 45° angle to the feed path 30. An array with couplers at different orientations may adjust to the different orientations of the transponders on the media units, by activating the couplers that share a similar orientation to the feed path as the transponders. Perpendicular and 45° degree orientations are only two examples of the various orientations that may be used within the present invention. The array may include couplers with any orientation (e.g., 0° through 90°). It should be understood that the array may include more than two couplers and more than two coupler orientations. Also, it should be understood that the type of couplers within the array may vary. For example, the array may include any type of stripline coupler or microstrip coupler.

Further, the present invention has been disclosed primarily in terms of a coupler configured to broadcast primarily in the near field. However, it must be understood that the enclosure describe herein for directing antenna coupler signals is not restricted to near field couplers. It is contemplated that any type of coupler could be encased in the enclosure to thereby direct the fields of the coupler to the open end or ends of the enclosure.

FIG. 3 illustrates an embodiment of the enclosure where the three sides of the dielectric substrates and the ground planes are interconnected by vias, such that the fields of the coupler are directed out of the fourth and active side. It must be understood that this is only an exemplary configuration. Many configurations of the enclosure may be employed to provide the desired field emission profile. Any pattern could be created by varying the portions of the sides or edges that are interconnected. For example, portions of the fourth sides could also be enclosed to further direct the field emissions. In particular, the end portions of the fourth sides of the ground planes could be interconnected to direct field emissions from a center portion of the fourth side of the enclosure. Oppositely, the center portion of the fourth side could be interconnected to direct the fields from the end portions of the fourth sides. Other examples come to mind. For example, open portions could be configured along any of the edges to give desired field emissions.

FIG. 3 illustrates a sandwich type arrangement where a conductive strip is sandwiched between two ground planes such that the fields are emitted from the sides of the coupler. The ground planes can be configured in any orientation to allowed field emissions from any side of the coupler. For example, ground planes could create a tray for the coupler having a bottom formed by a first ground plane and a side wall extending around the perimeter of the bottom and formed by additional ground planes. A microstrip could be located in the tray such that fields emitting from the microstrip are encourage to propagate through a top surface of the coupler defined by an open top of the tray.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A stripline coupler for a RFID enabled system having a transceiver, the coupler being adapted to couple a transceiver with a targeted transponder in a transponder encoding region from among a group of multiple adjacent transponders, the coupler comprising: a first ground plane and a second ground plane spaced apart from each other; at least one connection between the first ground plane and the second ground plane for connecting the first ground plane to the second ground plane; and a conductive strip being positioned at least partially between the first and second ground planes and configured to propagate a plurality of electromagnetic fields; wherein the first ground plane, the second ground plane, and the at least one connection promote propagation of the plurality of electromagnetic fields from a side of the conductive strip; and wherein the propagation of the plurality of electromagnetic fields from the side of the conductive strip is in a direction generally perpendicular to a length of the conductive strip and generally parallel to the first and second ground planes for coupling with the targeted transponder in the transponder encoding region.

2. The stripline coupler according to claim 1 further comprising a dielectric material positioned between the first ground plane and the second ground plane.

3. The stripline coupler according to claim 2, wherein the dielectric material is from the group consisting of a ceramic, a plastic, and a combination of ceramic and plastic.

4. The stripline coupler according to claim 2, wherein the dielectric material is air.

5. The stripline coupler according to claim 1, wherein the coupler is a near field coupler and the plurality of electromagnetic fields are concentrated in a near field region of the conductive strip.

6. The stripline coupler according to claim 5 further comprising an input port for connecting the coupler to the transceiver and a terminating load defining an input impedance, wherein the input impedance is substantially equal to a source impedance of the transceiver and wherein the conductive strip extends from a first end connected to the input port and a second end connected to the terminating load, wherein the first end and second end define a length of the conductive strip.

7. The stripline coupler according to claim 6, wherein the coupler is configured to operate within a band of frequencies and the conductive strip defines a width that remains substantially constant along the length of the conductive strip and the length of the conductive strip is substantially equal to a half wavelength of a center frequency of the band of frequencies.

8. The stripline coupler according to claim 6, wherein the coupler is configured to operate within a band of frequencies and the conductive strip defines a width that varies along the length of the conductive strip and defines a tapered profile and the length of the conductive strip is less than a half wavelength of a center frequency of the band of frequencies.

9. The stripline coupler according to claim 8, wherein the tapered profile is a modified bow-tie profile.

10. The stripline coupler according to claim 8, wherein the tapered profile is selected from the group consisting of an exponential profile and a Klopfenstein profile.

11. The stripline coupler according to claim 6, wherein the input port is adjacent to the first ground plane and is connected to the first end of the conductive strip by a connection extending from the first ground plane to the conductive strip and the terminating load is adjacent to the first ground plane and is connected to the second end of the conductive strip by a connection extending from the first ground plane to the conductive strip.

12. The stripline coupler according to claim 6, wherein the conductive strip defines a characteristic impedance less than the input impedance.

13. The stripline coupler according to claim 12, wherein the input impedance is substantially equal to 50 ohms.

14. The stripline coupler according to claim 1 further comprising a plurality of connections between the first ground plane and the second ground plane, wherein the connections extend substantially around the conductive strip and define one active side of the coupler free of connections and configured to promote the propagation of the electromagnetic fields from the active side for coupling with the targeted transponder.

15. An RFID system for selectively communicating with a targeted transponder from among a group of multiple adjacent transponders, the RFID system comprising: a transponder conveyance system adapted to transport at least one targeted transponder from a group of multiple adjacent transponders through a transponder encoding region along a predetermined path; and a coupler including a conductive strip, a first ground plane, and a second ground plane, wherein the conductive strip is positioned at least partially between the first and second ground planes and is configured to transmit and receive an electromagnetic field to and from the transponder encoding region for communicating with the targeted transponder; and wherein coupler includes a plurality of connections between the first ground plane and the second ground plane and the connections extend substantially around the conductive strip and define one active side of the coupler free of connections and configured to promote propagation of a plurality of electromagnetic fields from the active side in a direction generally perpendicular to the length of the conductive strip and generally parallel to the ground planes for coupling with the targeted transponder.

16. The RFID system according to claim 15 further including a transceiver configured to generate communication signals, wherein the transceiver is in electrical communication with the coupler.

17. The RFID system according to claim 16, wherein the coupler further includes a dielectric material positioned between the first ground plane and the second ground plane.

18. The RFID system according to claim 17, wherein the coupler is a near field coupler configured to create a plurality of electromagnetic fields concentrated in a near field region of the coupler.

19. The RFID system according to claim 8, wherein the near field coupler further includes a terminating load, and the conductive strip extends from an input end connected to the transceiver to a loaded end connected to the terminating load and between a first side edge and a second side edge, wherein the input end and the loaded end define a length of the conductive strip and the first side edge and the second edge define a width the conductive strip, and the width of the conductive strip is generally perpendicular to the targeted transponder during coupling.

20. The RFID system according to claim 19, wherein the terminating load is configured to match an input impedance of the near field coupler to a source impedance of the transceiver.

21. The RFID system according to claim 20, wherein the conductive strip defines a characteristic impedance less than the load impedance and the load impedance is substantially equal to the source impedance.

22. The RFID system according to claim 21, wherein the coupler is configured to operate within a band of frequencies and the width of the conductive strip remains substantially constant along the length of the conductive strip and the length of the conductive strip is substantially equal to a half wavelength of a center frequency of the band of frequencies.

23. The REID system according to claim 21, wherein the coupler is configured to operate within a band of frequencies and the width of the conductive strip varies along the length and defines a tapered profile and the length of the conductive strip is less than a half wavelength of a center frequency of the band of frequencies.

24. The REID system according to claim 23, wherein the tapered profile is a modified bow-tie profile.

25. The REID system according to claim 23, wherein the tapered profile is selected from the group consisting of an exponential profile and a Klopfenstein profile.

26. The REID system according to claim 15 further including a plurality of couplers for coupling with the at least one targeted transponder in the transponder encoding region.

* * * * *

UNITED STATES PATENT AND TRADEMARK OFFICE
CERTIFICATE OF CORRECTION

| | | |
|---|---|---|
| PATENT NO. | : 7,586,410 B2 | Page 1 of 1 |
| APPLICATION NO. | : 11/371785 | |
| DATED | : September 8, 2009 | |
| INVENTOR(S) | : Tsirline et al. | |

It is certified that error appears in the above-identified patent and that said Letters Patent is hereby corrected as shown below:

Column 14,

Line 1, 7, 9, and 12, "REID" should read --RFID--.

Signed and Sealed this

Second Day of February, 2010

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,586,410 B2 | Page 1 of 1 |
| APPLICATION NO. | : 11/371785 | |
| DATED | : September 8, 2009 | |
| INVENTOR(S) | : Tsirline et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 455 days.

Signed and Sealed this

Fourteenth Day of September, 2010

David J. Kappos
*Director of the United States Patent and Trademark Office*